United States Patent [19]

Cognard et al.

[11] 4,428,858
[45] Jan. 31, 1984

[54] COMPOSITION BASED ON LIQUID CRYSTAL FOR ELECTRO-OPTICAL DEVICE

[75] Inventors: Jacques Cognard, Chezard; Trung H. Phan, Neuchatel; Jurgen Markert, Ettingen, all of Switzerland

[73] Assignee: Ebauches S.A., Neuchatel, Switzerland

[21] Appl. No.: 186,138

[22] Filed: Sep. 11, 1980

[30] Foreign Application Priority Data

Oct. 2, 1979 [CH] Switzerland ............... 8863/79

[51] Int. Cl.$^3$ .................. C09K 3/34; G02F 1/13
[52] U.S. Cl. ........................... 252/299.1; 350/349
[58] Field of Search ................ 252/299.1; 350/349

[56] References Cited

U.S. PATENT DOCUMENTS

| | | |
|---|---|---|
| 3,960,751 | 6/1976 | Moriyama et al. ............ 252/299.1 |
| 4,032,219 | 6/1977 | Constant et al. ............. 252/299.1 |
| 4,232,949 | 11/1980 | Huffman ..................... 252/299.1 |
| 4,232,950 | 11/1980 | Benham ...................... 252/299.1 |
| 4,273,929 | 6/1981 | Boller et al. ................ 252/299.61 |
| 4,304,683 | 12/1981 | Morinaka et al. ............ 252/299.1 |
| 4,360,447 | 11/1982 | Morinaka et al. ............ 252/299.1 |
| 4,363,743 | 12/1982 | Moeller et al. .............. 252/299.1 |
| 4,376,715 | 3/1983 | Cognard et al. ............. 252/299.1 |

FOREIGN PATENT DOCUMENTS

| | | |
|---|---|---|
| 2104 | 5/1979 | European Pat. Off. ......... 252/299.1 |
| 25809 | 4/1981 | European Pat. Off. ......... 252/299.1 |
| 26004 | 4/1981 | European Pat. Off. ......... 252/299.1 |
| 38460 | 10/1981 | European Pat. Off. ......... 252/299.1 |
| 2815335 | 10/1978 | Fed. Rep. of Germany ... 252/299.1 |
| 2920730 | 11/1979 | Fed. Rep. of Germany ... 252/299.1 |
| 2902177 | 7/1980 | Fed. Rep. of Germany ... 252/299.1 |
| 3009940 | 9/1980 | Fed. Rep. of Germany ... 252/299.1 |
| 3009974 | 9/1980 | Fed. Rep. of Germany ... 252/299.1 |
| 3038372 | 5/1981 | Fed. Rep. of Germany ... 252/299.1 |
| 973262 | 10/1964 | United Kingdom ............ 252/299.1 |
| 2037803 | 7/1980 | United Kingdom ............ 252/299.1 |

OTHER PUBLICATIONS

Sheva; F. D., Xerox Discl. J., vol. 1, No. 9–10, pp. 61–62. (Sep./Oct. 1976).

Primary Examiner—Teddy S. Gron
Attorney, Agent, or Firm—Young & Thompson

[57] ABSTRACT

A composition for use in an electro-optical device, particularly a display device, contains anthraquinone pleochroic dye of formula (I):

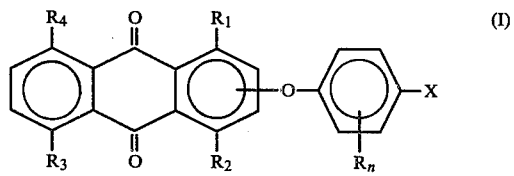

where $R_1$ is a substituted or unsubstituted amino group or a hydroxy group; $R_2$ is a hydrogen, a substituted or unsubstituted amino, a hydroxy or a cyano group; each of $R_3$ and $R_4$, which are identical or different, is a hydrogen atom, a substituted or unsubstituted amino group, a hydroxy, a nitro or a cyano group; R is a hydrogen or halogen atom or a hydroxy, lower alkyl or lower alkoxy group; n is 1, 2, 3 or 4, the Rs being identical or different when n is 2, 3 or 4; and X is a hydrogen or halogen atom, a hydroxy or mercapto group, a straight, branched or cyclic $C_{1-16}$ alkyl radical, a substituted or unsubstituted aryl group or a group of formula OR′, OAr, SR′, SAr, COOR′, COOAr, COO—$C_6H_4$—R′, OOCR′, OOCAr, OOC—$C_6H_4$—R′, CONHR′, CONHAr, NHR′, NHAr, NHCOR′, NHCOAr, OCOOR′, OCOOAr, CH=N—$C_6H_4$—R′, N=CH—$C_6H_4$—R′, N=N—$C_6H_4$—R′ or

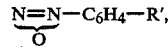

where R′ is a hydrogen atom or a straight, branched or cyclic $C_{1-10}$ alkyl residue.

Compounds of formula (I) have a high order parameter and are very stable.

7 Claims, No Drawings

COMPOSITION BASED ON LIQUID CRYSTAL FOR ELECTRO-OPTICAL DEVICE

The invention relates to liquid-crystal-based compositions for use in electro-optical devices and more particularly in display arrangements.

For a dye to be used appropriately in solution in a liquid crystal or a display arrangement, it must:
(a) be sufficiently soluble in the liquid crystal;
(b) be perfectly stable both chemically (in particular, inert relative to the liquid crystal) and above all photochemically
(c) have sufficient intensity of absorption; and
(d) not contain any ionic or ionisable groups. Furthermore, such a dye must have a high order parameter "S"—this parameter corresponding to the measure of the power of orientation of the dye by the molecules of the liquid crystal for a display with a strong contrast to be obtained. Finally, the basic structure of the compounds envisaged must of course correspond to a colour appropriate for use in a display arrangement, preferably blue and red.

The first dyes used in liquid crystals were azoic dyes or derivatives thereof, as disclosed particularly by D. L. White and G. N. Taylor, J. Appl. Phys. 45, 4718 (1974), by A. Bloom et al., Mol. Cryst. Liq. Cryst. Letters 41, 1 (1977) and by J. Constant et al., Elec. Letters, 12, 514 (1976). These compounds generally have a relatively high order parameter. On the other hand, most of them do not have an appropriate maximum absorption wavelength, and in particular azoïc dyes are not sufficiently stable to light, so they cannot be considered for use in manufacturing commercial liquid-crystal displays.

Research has therefore been carried out leading to the discovery of colouring agents with better stability relative to light. B.D.H. Chemicals Limited, for example, in published European Patent Application No. 78300487.2, have disclosed the fact that some classes of anthraquinones have a better combination of the desired properties mentioned above. These classes are more particularly the 1-p-substituted anilino-4-hydroxyanthraquinones and the 1,5-di(p-substituted anilino)-anthraquinones.

Although the above mentioned anthraquinone compounds brought a substantial improvement over azoïc compounds as colouring agents for liquid crystals, investigations have nevertheless continued into similar anthraquinone structures in an attempt to find other classes of compounds capable of giving still better combinations of the properties required for use in liquid-crystal display arrangements.

The invention is based inter alia on the discovery that basic anthraquinone structures, with an $NH_2$ or OH group in position 1, have a higher order parameter when a side chain is substituted on the anthraquinone ring in position 2 or in position 3, preferably in position 2.

The present invention provides a composition based on liquid crystal and designed for use in an electro-optical device, particularly a display arrangement, and containing as pleochroic dye an anthraquinone compound represented by general formula (I)

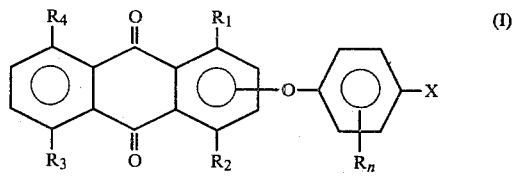

where $R_1$ is a substituted or unsubstituted amino group or a hydroxy group; $R_2$ is a hydrogen atom, a substituted or unsubstituted amino group, a hydroxy or a cyano group; each of $R_3$ and $R_4$, which are identical or different, is a hydrogen atom, a substituted or unsubstituted amino, a hydroxy, a nitro or a cyano group; R is a hydrogen or halogen atom or a hydroxy, lower alkyl or lower alkoxy group; n is 1, 2, 3 or 4, the Rs being identical or different when n is 2, 3 or 4; and X is a hydrogen or halogen atom, a hydroxy or mercapto group, a straight, branched or cyclic $C_{1-16}$ alkyl radical, a substituted or unsubstituted aryl group or a group of formula OR', OAr, SR', SAr, COOR', COOAr, COO—$C_6H_4$—R', OOCR', OOCAr, OOC—$C_6H_4$—R', CONHR', CONHAr, NHR', NHAr, NHCOR', NHCOAr, OCOOR', OCOOAr, CH=N—$C_6H_4$—R', N=CH—$C_6H_4$—R', N=N—$C_6H_4$—R' or

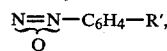

where R' is a hydrogen atom or a straight, branched or cyclic $C_{1-10}$ alkyl residue.

Such compounds have a good stability to light.

Some examples of basic anthraquinone structures are the structures of formula (II), each corresponding to a basic shade of colour,

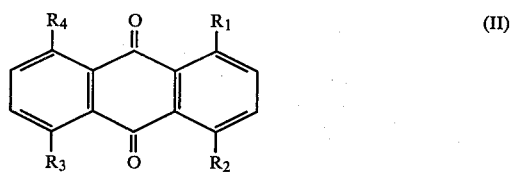

where $R_1$, $R_2$, $R_3$ and $R_4$ are as defined above and combined as set out in Table I below.

TABLE I

Basic anthraquinone structures of formula (II)

| Formula (II) | | | | Colour | |
|---|---|---|---|---|---|
| $R_1$ | $R_2$ | $R_3$ | $R_4$ | Shade | λ max. (CHCL$_3$) (nm) (*) |
| A | $NH_2$ | $NH_2$ | H | H | violet | 544–580 |
| B | $NH_2$ | H | $NH_2$ | H | orange | 475 |
| C | $NH_2$ | $NH_2$ | $NH_2$ | $NH_2$ | greenish blue | 580–624 |
| D | $NH_2$ | OH | H | H | red | 522–552 |
| E | $NH_2$ | OH | OH | $NH_2$ | blue | 572–608 |
| F | $NH_2$ | OH | $NH_2$ | OH | blue | 566–606 |
| G | $NH_2$ | $NH_2$ | $NO_2$ | H | blue | 558–604 |
| H | $NH_2$ | CN | H | H | yellow | 460 |

The introduction of a side chain in the basic formula (II) structures, in position 2 or in position 3, leads to the formula (I) compounds and is designed to increase the order parameter of these basic structures, while maintaining the other properties such as chemical stability and stability relative to light, while allowing for the fact that the nature of the side chain also influences on one hand the shade of colour of the basic structure, and on the other hand the solubility of this structure.

For example, the order parameter of the dye of structure F is of 0.51 in the liquid crystal "ROTN 103" of Hoffmann La-Roche A.G., whereas the order parameter of the derivative substituted in position 2 with a group $-O-C_6H_4-C_9H_{19}$ is of 0.64.

As far as the length of the side chain in position 2 or 3 is concerned, this at least partly determines the solubility of the formula (I) compound and should consequently not be more than about 24 carbon atoms. Substituents X and $R_n$ of the benzene ring present in the side chain in position 2 or 3 each preferably have a maximum with an aligning film (tangentially evaporated $SiO_x$ or polished polyimide). The optical density of each of the solutions is then measured at its maximum absorption in polarised light, firstly when the direction of the polariser is parallel with ($D \parallel$) and secondly when it is perpendicular to ($D\perp$) the direction of alignment. The order parameter is calculated from the following equation:

$$S = (r-1)/(r+2)$$

where r is the dichroïc ratio corresponding to the ratio $D \parallel /D\perp$. The results obtained have also been set out in Table II below.

TABLE II

| | | | Properties of formula (I) compounds | | | |
|---|---|---|---|---|---|---|
| | Compound (I) | | Physical Properties | | Optical Properties | Order Parameter |
| No. | Basic struct. (II) | Side chain in position 2 | Solubility (%) (in "ROTN 103") | Melting point (°C.) | λ max (CHCl₃) (nm) | S (in "ROTN 103") |
| 1 | D | $-O-C_6H_5$ | 2.5 | 185–187.8 | 519–556 | 0.62–0.62 |
| 2 | D | $-O-C_6H_4-CH_3$ | 4.5 | 173–183 | 496–554 | 0.60–0.58 |
| 3 | D | $-O-C_6H_4-C_3H_7$ | 7 | 134–135.6 | 514–550 | 0.60–0.59 |
| 4 | D | $-O-C_6H_4-CH(CH_3)_2$ | 3 | 175.6–180 | 516–552 | 0.59–0.58 |
| 5 | D | $-O-C_6H_4-C_4H_9$ | 5 | 136–143 | 496–554 | 0.60–0.60 |
| 6 | D | $-O-C_6H_4-C_9H_{19}$ | 1 | 44.9–54 | 519–552 | 0.59–0.60 |
| 7 | D | $-O-C_6H_4-O-C_5H_{11}$ | 3.5 | 142–146 | 512–550 | 0.57–0.57 |
| 8 | F | $-O-C_6H_4-C_9H_{19}$ | 2 | viscous product | 564–604 | 0.64–0.63 |
| 9 | G | $(3)-O-C_6H_4-C_4H_9$ | *7.8 | 161–171 | 552–592 | *0.58–0.58 |
| 10 | G | $-O-C_6H_4-C_4H_9$ | *4.0 | 167–176 | 552–592 | *0.64–0.66 |
| 11 | A | $-O-C_6H_5$ | *0.2 | 191–195 | 582 | * 0.67 |
| 12 | H | $-O-C_6H_4-C_4H_9$ | *1.6 | 170.8–174.7 | 460 | * 0.58 |
| 13 | F | $-O-C_6H_5$ | *2 | >360 | 618 | 0.61 |

NB.
The values marked with an asterisk (*) have been measured in liquid crystal "E7" of BDH Chemicals Ltd.

of 10 carbon atoms, but when several of these groups are present simultaneously the total number of carbon atoms should not theoretically exceed about 24. Above this figure there is a probability that compound (I) may not be sufficiently soluble in the liquid crystal and could consequently not be used to colour it.

The invention will now be illustrated with examples in which the properties of some formula (I) compounds have been studied. More particularly, the solubility and order parameter of the compounds mentioned in Table II below have been measured, using the following known methods:

MEASUREMENT OF SOLUBILITY (BY COLORIMETRY)

A saturated solution of each of compounds 1 to 13 of Table II is prepared in a liquid crystal, and the solution obtained is filtered, 100 μl of the filtrate is taken out and dissolved in 50 cc of chloroform. The optical density of each solution is measured spectroscopically, and the concentration of the dye at saturation is deducted from the reading, the coefficient of absorption ε being known in chloroform.

The results obtained are set out in Table II. In connection with the values given for solubility, it should be pointed out that the solutions were considered as saturated when they contained grains of colouring agent after being heated in isotropic phase and agitated for 3 minutes.

DETERMINATION OF ORDER PARAMETER (S)

A 0.5% solution of each of compounds 1 to 13 in a liquid crystal is placed in a glass cell 30μ thick, coated As far as the lifetime of the formula (I) anthraquinone dye and hence of the composition of the invention is concerned, this depends essentially on the stability of the dye in light. The lifetime is therefore measured as follows for compounds 1 to 13 in Table II.

A glass cell, similar to that used in determining the order parameter, and containing a solution of each of the above mentioned compounds in a liquid crystal, is subjected to radiation from a "Xenon" lamp, filtered so as to reconstitute solar illumination at midday in our latitudes (Leybold Heraeus Sun Test). The thickness of the cell and the concentration of each solution are adjusted to bring the optical density close to 1, and the time taken for the optical density to reach half its initial value is measured. In the case of the formula (I) compounds in Table II, all have a half life of over 1000 hours. This is perfectly adequate in practice for use as liquid crystal dyes intended for display cells, e.g. for watches or measuring instruments.

The formula (I) compounds which can be used as dyes in solution in liquid crystals for display devices may be prepared by conventional methods of synthesising anthraquinone compounds; and so as to illustrate the substitution of a side chain in position 2 of the anthraquinonic basic structure, the preparation of compound 4 will now be described.

PREPARATION OF AMINO-1-HYDROXY-4-(ISOPROPYL-4-PHENOXY)-2-ANTHRAQUINONE

A mixture of 1.3 g of isopropyl-4-phenol dissolved in 10 ml dimethylformamide and of 0.5 g of potassium hydroxide dissolved in 0.5 ml of water is heated to 100° C. A solution of 2.0 g of amino-1-bromo-2-hydroxy-4-anthraquinone dissolved in 40 ml dimethylformamide is added to said mixture, and the temperature of the reaction mixture is progressively increased until 120°–125° C. and maintained for 3 hours. Then the reaction mixture is poured in about 100 ml of water, acidified with glacial acetic acid, filtered and washed with water. The red dye corresponding to Compound 4 is thus obtained under a rather pure form. For evaluation purpose, a further purification is carried out by chromatography on silica gel.

In the composition according to the invention a single type of liquid crystal may be used, or preferably a mixture of liquid crystals such as those marketed e.g. by BDH Chemicals Limited under references E3, E7, E8 or E9, the respective compositions being mentioned in published European Patent Application No. 78300487.2, or by Hoffmann La-Roche under reference ROTN-103. The liquid crystals should preferably be neumatic with positive or negative anisotropy, and may or may not contain an optically active agent in addition.

The compositions according to the invention may further comprise two or more formula (I) dyes or possibly other types of anthraquinone dyes, as well as a cholesterising agent and/or an aligning agent. The cholesterising agent may be the one known from BDH Chemicals Limited under reference "CB 15", which is preferably added in a quantity of about 3% of the total composition. The aligning agent designed to disperse the molecules of the liquid crystals perpendicularly to walls of the electro-optical device may be approximately 2% of a surfactant, for example a sorbitol monoester, sorbitol monolaurate being particularly suitable.

Finally, the pleochroic dye of formula (I) is generally present in the composition of the invention in a quantity corresponding to about 0.5 to 5% of the total composition, e.g. preferably about 1.5%.

As commercially available eutectic mixtures which are usable as liquid crystals in the composition according to the invention, the following can be mentioned by way of examples, i.e. "TN 103" of Hoffmann La-Roche (CH) and "ZLI 1132" of E. Merck, Darnstadt, West Germany, the essential characteristics of which are:

| Commercial name | Basic compositions of liquid crystals | $T_{NI}(°C.)$ | $\Delta\epsilon$ |
|---|---|---|---|
| TN 103 | cyano-esters | 81.4 | +25.6 |
| ZLI 1132 | phenyl-cyanohexane | 70 | +10.3 |

$T_{NI}$:Temperature of nematic-isotropic transition
$\Delta\epsilon$:dielectric anisotropy Some examples of compositions according to the invention are mentioned in the following Table III, which allow the realization for example of a display cell working at 4.5 V and with a thickness of 8 μm, for example to be used in a watch or in a measuring instrument.

The appropriate dye concentration is determined depending on the aimed appearance and taking account of the cell thickness, whereas the cholesterising agent concentration "CB15" is such that the pitch of the induced cholesteric helix corresponds to the used thickness.

TABLE III

| Examples of compositions according to the invention | | | |
|---|---|---|---|
| Dye No. | Liquid crystal (comm.name) | Dye (%) | "CB 15" (%) | $T_{NI}(°C.)$ |
| 2 | TN 103 | 3.9 | 4.79 | 80.2 |
| 3 | TN 103 | 6.3 | 4.79 | 80.3 |
| 4 | TN 103 | 2.4 | 4.79 | 79.9 |
| 7 | TN 103 | 3.4 | 4.79 | 81.0 |
| 8 | TN 103 | 1.8 | 4.79 | 75.3 |
| 12 | ZLI 1132 | 0.1 | 3.31 | 72.4 |

Of course, other matrix (Host) of liquid crystal may be convenient and the device thereof will be made according to the aimed application.

What is claimed is

1. A composition based on liquid crystal and designed for use in an electro-optical device, that contains as pleochroic dye an anthraquinone compound selected from the group consisting of

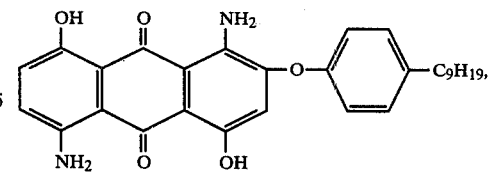

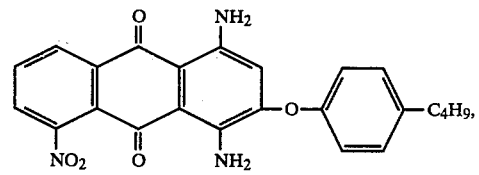

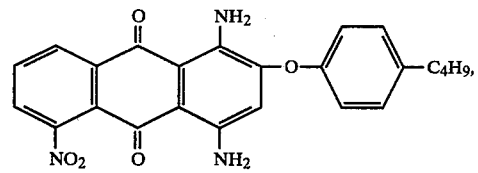

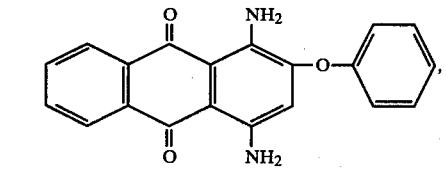

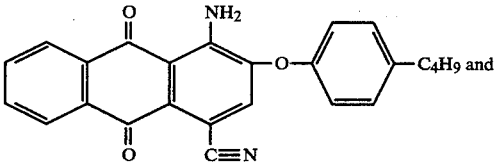

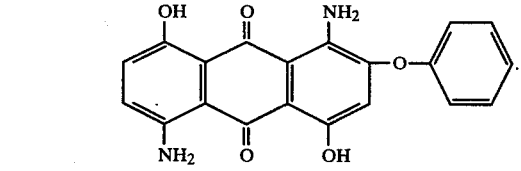

2. A composition as claimed in claim 1, that comprises one or more nematic liquid crystals with positive or negative anisotropy.

3. A composition as claimed in claim 1, that comprises an optically active agent that induces a cholesteric structure and/or an aligning agent.

4. A composition as claimed in claim 1, in the form of a solution of 0.5 to 5% of a said anthraquinone compound.

5. A composition as claimed in claim 1, that comprises about 1.5% of said anthraquinone compound, about 3% of a cholesteric agent, and about 2% of an aligning agent.

6. A composition as claimed in claim 1, that comprises a mixture of said members.

7. A composition as claimed in claim 1, that comprises also an anthraquinone dye other than a said member.

* * * * *